(12) United States Patent
Yoo et al.

(10) Patent No.: US 8,876,994 B2
(45) Date of Patent: Nov. 4, 2014

(54) POROUS SHEET AND METHOD FOR MANUFACTURING THE POROUS SHEET

(75) Inventors: Jun Hwan Yoo, Seoul (KR); Jin Wook Na, Gyeonggi-do (KR); Jea Sik Ryoo, Gyeonggi-do (KR); Sun Ok Kim, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/621,008

(22) Filed: Sep. 15, 2012

(65) Prior Publication Data

US 2013/0078882 A1 Mar. 28, 2013

(30) Foreign Application Priority Data

Sep. 27, 2011 (KR) .................. 10-2011-0097814

(51) Int. Cl.
| | | |
|---|---|---|
| *B32B 27/12* | (2006.01) | |
| *B32B 37/12* | (2006.01) | |
| *D04H 1/728* | (2012.01) | |
| *D04H 3/12* | (2006.01) | |
| *D01D 5/00* | (2006.01) | |
| *B32B 5/26* | (2006.01) | |
| *D04H 1/4374* | (2012.01) | |
| *D04H 1/4382* | (2012.01) | |
| *B32B 29/02* | (2006.01) | |
| *D01F 1/10* | (2006.01) | |
| *B32B 5/02* | (2006.01) | |
| *B32B 7/12* | (2006.01) | |

(52) U.S. Cl.
CPC ...... *B32B 5/26* (2013.01); *D01D 5/003* (2013.01); *D04H 3/12* (2013.01); *B32B 27/12* (2013.01); *D01D 5/0038* (2013.01); *D01D 5/0084* (2013.01); *D04H 1/4374* (2013.01); *D04H 1/4382* (2013.01); *B32B 29/02* (2013.01); *D01F 1/10* (2013.01); *B32B 2255/02* (2013.01); *B32B 5/022* (2013.01); *D04H 1/728* (2013.01); *B32B 2307/21* (2013.01); *B32B 37/1284* (2013.01); *B32B 7/12* (2013.01)
USPC .......... 156/62.4; 156/167; 156/176; 156/181; 264/465

(58) Field of Classification Search
CPC .......... B32B 5/26; B32B 29/02; B32B 37/12; B32B 37/1284; B32B 2250/20; D01D 5/003; D01D 5/0038; D01F 1/10; D04H 1/4374; D04H 1/4382; D04H 1/542; D04H 1/728; D06M 17/04
USPC ......... 156/62.2, 62.4, 167, 176, 181; 264/465
See application file for complete search history.

(56) References Cited

U.S. PATENT DOCUMENTS

| | | | | |
|---|---|---|---|---|
| 3,110,548 A | * | 11/1963 | Fukushima et al. | 264/168 |
| 3,717,528 A | * | 2/1973 | Peerman et al. | 156/179 |
| 2003/0190383 A1 | * | 10/2003 | Kim | 425/110 |

FOREIGN PATENT DOCUMENTS

| | | |
|---|---|---|
| JP | 2007-303015 A | 11/2007 |
| JP | 2007-308666 A | 11/2007 |

(Continued)

OTHER PUBLICATIONS

Korean Office Action for Serial No. 10-2011-0097814 dated Feb. 28, 2013.

(Continued)

*Primary Examiner* — Michael Tolin
(74) *Attorney, Agent, or Firm* — McDermott Will & Emery LLP (57) ABSTRACT

The present invention relates to a porous sheet and a method for manufacturing the porous sheet. A porous sheet including a fine-fiber web layer and a support layer and a method for manufacturing the same are provided, and it is possible to implement a porous sheet with sufficient strength and thickness to be used in peeling and laminating processes of a multilayer ceramic capacitor.

2 Claims, 7 Drawing Sheets

(56) References Cited

FOREIGN PATENT DOCUMENTS

| | | |
|---|---|---|
| JP | 2008-162098 A | 7/2008 |
| JP | 2009-006272 A | 1/2009 |
| JP | 2011-132633 A | 7/2011 |
| KR | 10-0422459 B1 | 3/2004 |
| KR | 2007-0076474 A | 7/2007 |
| KR | 2007-0089071 A | 8/2007 |
| KR | 1020090128106 A | 12/2009 |
| KR | 2010-0024123 A | 3/2010 |
| WO | WO 2008/018656 A1 * | 2/2008 |

OTHER PUBLICATIONS

Office Action Japanese Patent Application No. 2012-204675 dated Aug. 27, 2013.

Korean Office Action issued in Korean Application No. 10-2011-0097814 dated Dec. 30, 2013.

Korean Office Action issued in Korean Application No. 10-2011-0097814 dated Aug. 28, 2014.

Japanese Office Action issued in Japanese Application No. 2012-204675 dated Jul. 15, 2014.

* cited by examiner

FIG. 1

- PRIOR ART -

POROUS SHEET AND METHOD FOR MANUFACTURING THE POROUS SHEET

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2011-0097814, entitled filed Sep. 27, 2011, which is hereby incorporated by reference in its entirety into this application.

BACKGROUND OF THE INVENTION

1. Field of the Invention

The present invention relates to a porous sheet and a method for manufacturing the porous sheet, and more particularly, to a porous sheet that is capable of being used in processes such as suction peeling and vacuum suction fixing in manufacture of a glass substrate for liquid crystal, a semiconductor wafer, or a multilayer ceramic capacitor.

2. Description of the Related Art

In general, peeling of a ceramic green sheet is performed by vacuum, and peeling force is changed according to the shape of a structure that can suck the ceramic green sheet by vacuum.

In the prior art, a metal body or a sintered metal body having surface holes in a portion in contact with a ceramic green sheet in a vacuum is used or a metal plate in which holes are formed at regular intervals by etching is used.

However, since a peeling mold is formed of a metal body, there is a problem that a contact portion of the ceramic green sheet is damaged. Further, there is a problem that the ceramic green sheet is damaged by holes formed in the peeling mold.

Like this, when a surface of the ceramic green sheet for manufacturing a multilayer ceramic capacitor is damaged, an internal pattern formed on the surface of the ceramic green sheet is damaged and thus it may cause product defects such as a short after lamination.

Accordingly, studies on a porous suction sheet, which can easily peel a ceramic green sheet with strong suction force without damaging the ceramic green sheet, have been continuously made. Currently, a porous sheet, that is, a porous ultrahigh molecular weight polyethylene sheet attached to a peeling mold having fine holes has been applied to peeling and lamination processes of the multilayer ceramic capacitor. This technology is disclosed in Patent Document 1.

Figure 1:
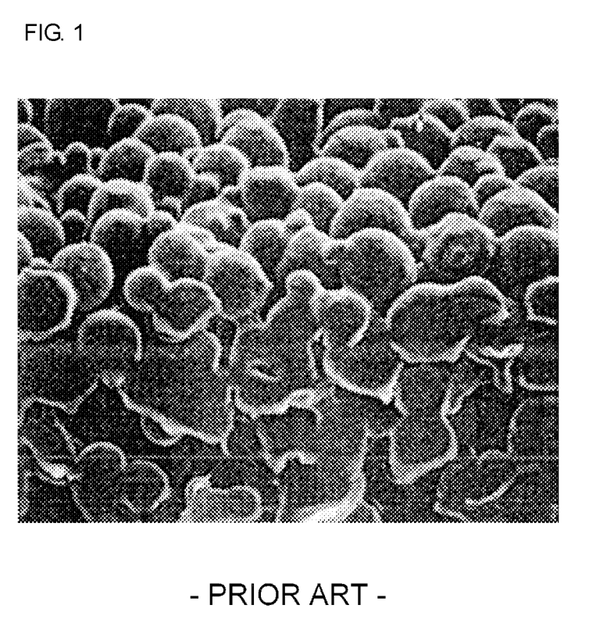
FIG. 1 is a scanning electron microscope photograph of a cross section of a porous sheet in accordance with the prior art.

FIG. 1 is a scanning electron microscope photograph of a cross section of a porous sheet disclosed in the Patent Document 1.

A porous ultrahigh molecular weight polyethylene sheet is manufactured by sintering ultrahigh molecular weight polyethylene powder using heated vapor and cooling and cutting the sintered body, and it is possible to manufacture a sheet with a relatively large thickness and improve surface roughness, coefficient of friction, rigidity, and so on according to manufacturing processes.

Referring to FIG. 1, it is possible to check that the porous sheet is made of particulate ultrahigh molecular weight polyethylene powder.

However, since this porous ultrahigh molecular weight polyethylene sheet has problems such as high manufacturing costs in manufacturing processes, variation between lots and between products, and difficulty in reducing the size of pores for securing porosity, it is difficult to cope with thinning of products.

RELATED PRIOR ART DOCUMENT

Patent Document 1: Korean Patent Laid-open Publication No. 2007-0089071

SUMMARY OF THE INVENTION

The present invention has been invented in order to overcome the above-described problems and it is, therefore, an object of the present invention to provide a porous sheet capable of being implemented with sufficient strength and thickness to be used in a peeling process of a multilayer ceramic capacitor and so on, and a method for manufacturing the porous sheet.

Further, it is another object of the present invention to provide a porous sheet and a method for manufacturing the porous sheet capable of reducing manufacturing costs by simplifying manufacturing processes.

Further, it is another object of the present invention to provide a porous sheet having high porosity and excellent surface roughness and capable of selecting various materials according to product characteristics and minimizing damage to an object to be sucked during suction and peeling, and a method for manufacturing the porous sheet.

Further, it is another object of the present invention to provide a porous sheet having excellent rigidity, resistance to external scratches and deformation, and low surface resistance, and a method for manufacturing the porous sheet.

Further, it is another object of the present invention to provide a porous sheet capable of being applied to various fields, and a method for manufacturing the porous sheet.

In accordance with an embodiment of the present invention to achieve the object, there is provided a porous sheet including: a fine-fiber web layer consisting of fine-fibers with a diameter of 50 to 5000 nm; and a support layer having the fine-fiber web layer coupled to one or both surfaces thereof.

At this time, a coating layer made of an antistatic material may be provided on a surface of the fine-fiber.

Further, the support layer may be made of a paper or nonwoven material.

Further, the support layer may be made of a paper or nonwoven material and include a fibrous texture with a diameter of greater than 1 μm.

Further, the fine-fiber may have a diameter of 100 to 3000 nm.

Further, the fine-fiber web layer may have a thickness of 1 to 200 μm.

Further, the support layer may have a thickness of 30 to 5000 μm.

Further, the fine-fibers constituting the fine-fiber web layer may be bonded to each other by an adhesive material.

Further, cross portions of the fine-fibers may be bonded by the adhesive material.

Further, the fine-fiber may be formed by mixing a polymer and the adhesive material.

Further, the polymer may be one or two or more selected from the group consisting of polyvinylidene fluoride, polyvinyl alcohol, polyethylene terephthalate, polycarbonate, polyetherimide, polyethylene oxide, polylactic acid, cellulose, aromatic polyester, polyphosphazenes, polyurethane, polyurethane copolymer including polyether urethane, cellulose acetate, cellulose acetate butylate, cellulose acetate propionate, polyvinylidene fluoride, perfluoropolymer, polyvinylchloride, polyvinylidene chloride, polyethylene glycol derivatives, polyoxide, polyvinyl acetate, polystyrene, polyacrylonitrile, and polymethylmethacrylate.

At this time, the adhesive material may be one or at least two kinds of materials selected from epoxy adhesive materials, acrylate adhesive materials, and silicone adhesive materials.

Further, the fine-fiber may be formed by attaching the adhesive material to a surface of a fine-fiber made of a polymer.

In accordance with an embodiment of the present invention to achieve the object, there is provided a method for manufacturing a porous sheet including: a first step of preparing a spinning solution by mixing a polymer solution in which a polymer is dissolved and an adhesive solution in which an adhesive material is dissolved; and a second step of forming a fine-fiber web layer in which the polymer and the adhesive material are mixed by electrospinning the spinning solution on one surface of a support layer.

At this time, the second step may perform electrospinning of the spinning solution after applying an adhesive on the support layer.

Further, the adhesive may be one or at least two kinds of materials selected from epoxy adhesives, acrylate adhesives, and silicone adhesives.

Further, the second step may perform electrospinning on the other surface of the support layer after performing electrospinning on one surface of the support layer.

Further, in the spinning solution, the polymer solution content may be 85 to 97.5 wt %, and the adhesive solution content may be 2.5 to 15 wt %.

Further, the adhesive material content in the adhesive solution may be 30 to 50 wt %.

Further, the polymer may be one or two or more selected from the group consisting of polyvinylidene fluoride, polyvinyl alcohol, polyethylene terephthalate, polycarbonate, polyetherimide, polyethylene oxide, polylactic acid, cellulose, aromatic polyester, polyphosphazenes, polyurethane, polyurethane copolymer including polyether urethane, cellulose acetate, cellulose acetate butylate, cellulose acetate propionate, polyvinylidene fluoride, perfluoropolymer, polyvinylchloride, polyvinylidene chloride, polyethylene glycol derivatives, polyoxide, polyvinyl acetate, polystyrene, polyacrylonitrile, and polymethylmethacrylate.

Further, the adhesive material may be one or at least two kinds of materials selected from epoxy adhesive materials, acrylate adhesive materials, and silicone adhesive materials.

Further, after the second step, the method for manufacturing a porous sheet may further include the step of performing a calendering process of thermally compressing the fine-fiber web layer.

Further, after the second step, the method for manufacturing a porous sheet may further include the step of performing a surface treatment process of coating an antistatic material on the fine-fiber web layer.

In accordance with an embodiment of the present invention to achieve the object, there is provided a method for manufacturing a porous sheet including: a spinning solution preparing step of preparing a spinning solution by mixing a polymer solution in which a polymer is dissolved and an adhesive solution in which an adhesive material is dissolved; an electrospinning step of forming fine-fibers in which the polymer and the adhesive material are mixed by electrospinning the spinning solution; an adhesive solution spraying step of spraying the adhesive solution in which the adhesive material is dissolved toward the fine-fibers; and a fine-fiber web layer forming step of forming a fine-fiber web layer by coupling the fine-fibers passed through the adhesive solution spraying step to a support layer.

In accordance with an embodiment of the present invention to achieve the object, there is provided a method for manufacturing a porous sheet including: a spinning solution preparing step of preparing a spinning solution by mixing a polymer solution in which a polymer is dissolved and an adhesive solution in which an adhesive material is dissolved; an electrospinning step of forming fine-fibers in which the polymer and the adhesive material are mixed by electrospinning the spinning solution; a polymer solution spraying step of spraying the polymer solution in which the polymer is dissolved toward all or a portion of the fine-fibers; and a fine-fiber web layer forming step of forming a fine-fiber web layer by coupling the fine-fibers passed through the polymer solution spraying step to a support layer.

In accordance with an embodiment of the present invention to achieve the object, there is provided a method for manufacturing a porous sheet including: a spinning solution preparing step of preparing a spinning solution by mixing a polymer solution in which a polymer is dissolved and an adhesive solution in which an adhesive material is dissolved; an electrospinning step of forming fine-fibers in which the polymer and the adhesive material are mixed by electrospinning the spinning solution; and a fine-fiber web layer forming step of forming a fine-fiber web layer by bringing the fine-fibers in contact with a support layer and heating and pressing all or a portion of the fine-fibers.

In accordance with an embodiment of the present invention to achieve the object, there is provided a method for manufacturing a porous sheet including: a spinning solution preparing step of preparing a polymer-containing spinning solution; an electrospinning step of forming fine-fibers made of a polymer by electrospinning the spinning solution; an adhesive solution spraying step of spraying an adhesive solution in which an adhesive material is dissolved toward the fine-fibers; and a fine-fiber web layer forming step of forming a fine-fiber web layer by coupling the fine-fibers passed through the adhesive solution spraying step to a support layer.

At this time, the fine-fiber web layer forming step may thermally compress the fine-fiber web layer and the support layer.

Further, a diameter of the fine-fiber may be 100 to 3000 nm.

Further, a coating layer made of an antistatic material may be provided on a surface of the fine-fiber.

Further, the support layer may be made of a paper or nonwoven material.

Further, the support layer may be made of a paper or nonwoven material and include a fibrous texture with a diameter of greater than 1 μm.

Further, the fine-fiber web layer may have a thickness of 1 to 200 μm.

Further, the support layer may have a thickness of 30 to 5000 μm.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art. Like reference numerals refer to like elements throughout the specification.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Hereinafter, configuration and operational effect of the present invention will be described in detail with reference to the accompanying drawings.

Porous Sheet

Figure 2:
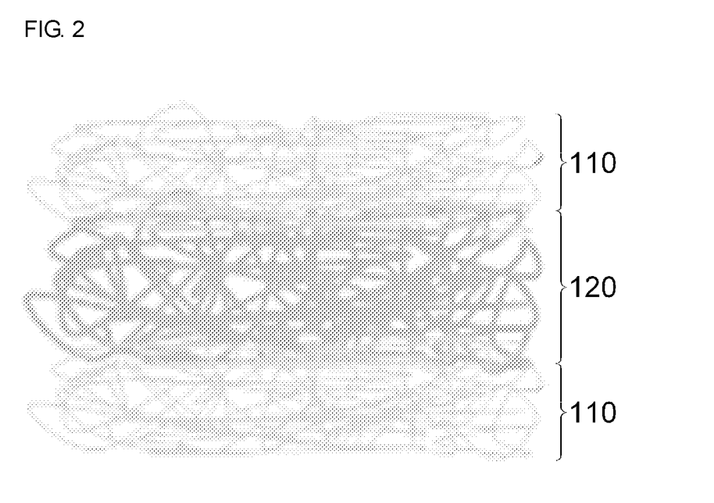
FIG. 2 is a view schematically illustrating a cross section of a porous sheet in accordance with an embodiment of the present invention.

FIG. 2 is a view schematically illustrating a cross section of a porous sheet in accordance with an embodiment of the present invention.

Referring to FIG. 2, a porous sheet in accordance with an embodiment of the present invention may consist of a fine-fiber web layer and a support layer.

The fine-fiber web layer may consist of fine-fibers with a diameter of 100 to 3000 µm.

When the diameter of the fine-fiber is too small, it is not possible to effectively suck an object to be sucked due to insufficient air permeability, and on the contrary, when the diameter of the fine-fiber is too large, there is a problem that a surface of the object to be sucked is damaged due to unevenness of the fine-fiber itself.

Meanwhile, the fine-fibers 111 constituting the fine-fiber web layer 110 can be formed by an electrospinning method. Here, the electrospinning method is a method of obtaining a product by instantaneously spinning a polymer in a low viscosity state into fibers by electrostatic force.

The electrospinning method has an important characteristic that it can make fibers in nanometers (nm) or micrometers (µm) by using a material with a diameter in millimeters (mm). When manufacturing fine-fibers using an electrospinning method, there is an advantage that fibers with various thicknesses and properties can be manufactured according to characteristics (viscosity, surface tension, conductivity, and so on) of a spinning solution, size of difference of potential applied, distance between a nozzle and a collector, and so on.

For example, when a high voltage electric field is applied to a polymer material as a raw material, electrical repulsion is generated in the raw material so that molecules agglomerate together and are split in the form of nanometer or micrometer-sized yarn. At this time, the stronger the electric field is, the finer the molecules are split. The fine-fiber web layer is formed without a separate weaving process only by gathering such yarns together so that the yarns are entangled with each other.

The fine-fiber web layer formed like this has high porosity and excellent surface roughness since the diameter of the fine-fibers 111 constituting the fine-fiber web layer is in nanometers (nm) or micrometers (µm).

However, since this fine-fiber web layer is simply formed by the entanglement of the fine-fibers 111, it is likely to be damaged when in contact with external materials due to low strength, weakness to external scratches and deformation, and high surface resistance. Therefore, a structure for improving rigidity is needed.

Further, when the fine-fiber web layer is formed with a thickness of greater than 200 µm by continuously accumulating polymer fibers with the same charge, since repulsion gets stronger, the strength of the fine-fiber web layer is reduced and it is difficult to form the fine-fiber web layer thicker by the electrospinning method.

Therefore, since the fine-fiber web layer is coupled to one or both surfaces of the support layer, the porous sheet in accordance with an embodiment of the present invention can be implemented with sufficient strength and thickness to be used in peeling and laminating processes of a multilayer ceramic capacitor.

Further, it is preferred that the fine-fiber is a long fiber with a length of greater than 10 µm.

In general, carbon nanotube (CNT) is formed to have a length within several µm, and when the fine-fiber web layer consists of short fine-fibers, since rigidity for supporting each other may be reduced, it is preferred that the fine-fiber web layer in accordance with an embodiment of the present invention consists of fine-fibers with a length of greater than 10 μm.

Further, a functional material such as an antistatic agent, an antifouling agent, or a strength reinforcing agent may be coated on a surface of the fine-fiber.

Further, the support layer may be made of a paper or nonwoven material and include a fibrous texture with a diameter of greater than 1 μm.

This fibrous texture performs a role of allowing a fluid such as air to smoothly pass the support layer.

Meanwhile, the fine-fiber web layer may be formed with a thickness of 1 to 200 μm, and the support layer may be formed with a thickness of 30 to 5000 μm.

When the fine-fiber web layer is too thin, there is a problem that the surface of the object to be sucked is damaged due to unevenness of a surface of the support layer, and when the fine-fiber web layer is too thick, the strength of the fine-fiber web layer is reduced. Since there is a limitation on spinning thickness of the fine-fiber by the electrospinning method, enormous expense is required to overcome this limitation and time required for electrospinning is also greatly increased.

Further, when the support layer is too thin, the strength and thickness of the porous sheet itself do not meet conditions for suction, and when the support layer is too thick, suction force is reduced due to an outflow of a fluid such as air through the support layer.

Figure 3:
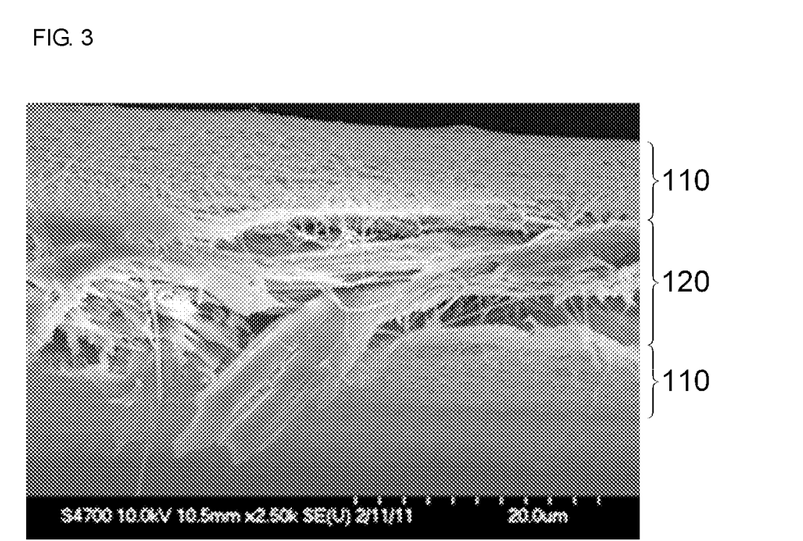
FIG. 3 is a view illustrating a cross-sectional structure of the porous sheet in accordance with an embodiment of the present invention.
Figure 4:
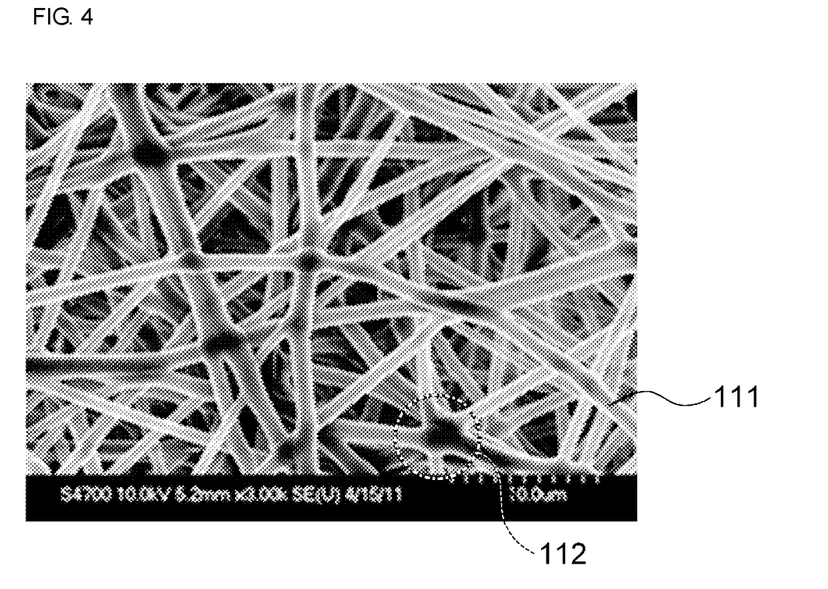
FIG. 4 is a view illustrating a detailed structure of a fine-fiber web layer in accordance with an embodiment of the present invention.

FIG. 3 is a view illustrating a cross-sectional structure of the porous sheet in accordance with an embodiment of the present invention, and FIG. 4 is a view illustrating a detailed structure of the fine-fiber web layer in accordance with an embodiment of the present invention.

Referring to FIG. 3, it is possible to check that the porous sheet in accordance with an embodiment of the present invention is implemented by forming the fine-fiber web layers 110 on both surfaces of the support layer 120.

Although FIG. 3 illustrates that the fine-fiber web layers 110 are formed on the both surfaces of the support layer 120, the fine-fiber web layer 110 may be formed only on one surface of the support layer 120.

Referring to FIG. 4, the porous sheet in accordance with an embodiment of the present invention includes the fine-fiber web layer 110 consisting of the fine-fibers 111.

In this embodiment, the fine-fiber 111 is a fiber with a diameter of several tens to thousands of nanometers. In this embodiment, the diameter of the fine-fiber 111 may be 50 to 5000 μm.

Further, various polymer materials can be used as a raw material for forming the fine-fiber 111 according to purposes.

For example, the raw material of the fine-fiber 111 may be one or a mixture of two or more selected from the group consisting of polyvinylidene fluoride, polyvinyl alcohol, polyethylene terephthalate, polycarbonate, polyetherimide, polyethylene oxide, polylactic acid, cellulose, aromatic polyester, polyphosphazenes, polyurethane, polyurethane copolymer including polyether urethane, cellulose acetate, cellulose acetate butylate, cellulose acetate propionate, polyvinylidene fluoride, perfluoropolymer, polyvinylchloride, polyvinylidene chloride, polyethylene glycol derivatives, polyoxide, polyvinyl acetate, polystyrene, polyacrylonitrile, and polymethylmethacrylate but not particularly limited thereto, and polymers commonly used such as water-soluble polymers or organic polymers can be used.

Further, in this embodiment, as shown in FIG. 4, a junction portion 112 by an adhesive material is formed to improve the strength of the fine-fiber web layer.

At this time, the junction portion 112 is a portion in which the fine-fibers 111 are bonded by the adhesive material. In other words, the junction portion 112 is a portion in which the fine-fibers bonded by the adhesive material cross each other.

Here, in this embodiment, the adhesive material is an acrylate material which is a natural curable material but not particularly limited thereto, and it is also possible to use a thermosetting material, a UV curable material, or the same material as the polymer material which is used as a main material of the fine-fiber 111.

The fine-fiber 111 formed according to this embodiment has a form of fine-fiber in which the polymer material as a main material and the adhesive material are mixed or in which the adhesive material is attached to the surface of the fine-fiber 111 made of the polymer material as a main material but not particularly limited thereto.

At this time, the form of the fine-fiber in which the adhesive material is mixed or the form of the fine-fiber in which the adhesive material is attached varies according to manufacturing processes, and detailed description of this will be made in the following description of a method for manufacturing a porous sheet.

Like this, since the porous sheet using the fine-fiber web consisting of the fine-fibers 111 whose cross portions are bonded by the adhesive material has remarkably improved strength and thus does not need an additional stabilization process, it has high suction and peeling properties due to improved porosity while reducing manufacturing costs due to simple manufacturing processes.

Further, since the porous sheet has very excellent rigidity due to the junction portion 112 between the fine-fibers 111, resistance to external scratches and deformation, and low surface roughness, it is excellent in handling and workability.

For example, the porous sheet consisting of the fine-fiber web in accordance with this embodiment may be used as a porous suction sheet that can be applied to suction peeling and vacuum suction processes in manufacture of a glass substrate for liquid crystal, a semiconductor wafer, and a multilayer ceramic capacitor.

Further, the porous sheet in accordance with this embodiment can be applied to a separator of a secondary battery consisting of a cathode active material, an anode active material, an electrolyte, and the separator.

Here, the secondary battery is a battery that can be reused by being recharged with external energy after discharge to be returned to an original state. This secondary battery has high power density, can perform high output discharge, and is less affected by temperature.

As described above, this secondary battery consists of four major components of the cathode active material, the anode active material, the electrolyte, and the separator, and among them, the separator performs a role of shorting between the cathode active material and the anode active material and is used as a moving path of ions.

Like this, since the separator provides the moving path of the ions while preventing movement of external foreign materials, a pore size thereof should be less than several micrometers (μm).

Since a conventional method for manufacturing a separator of a secondary battery includes a stretching process for forming pores and materials that can be used are limited to polyolefin materials, it is not suitable for implementing high functionality due to a narrow range of material selection.

However, since the porous sheet in accordance with the present invention is manufactured by an electrospinning method and thus does not require a separate process for forming pores, there is freedom of material selection. Like this, due to the freedom of material selection, the separator using the porous sheet in accordance with the present invention can have higher functionality than the separator in accordance with the prior art.

Further, it is apparent that the porous sheet in accordance with this embodiment can be applied to various fields in addition to the above-described suction sheet and separator.

Method for Manufacturing Porous Sheet

First Embodiment

Figure 5:
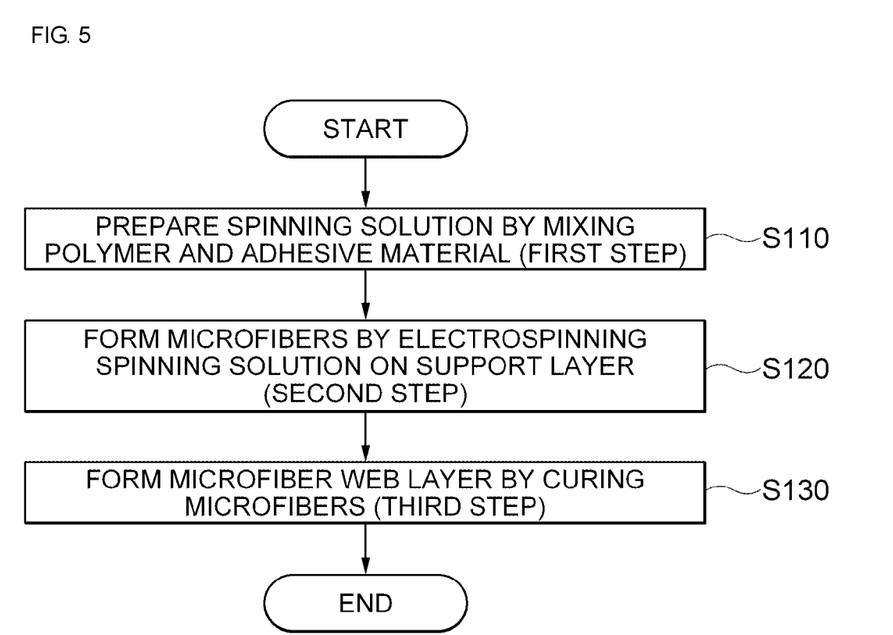
FIG. 5 is a flowchart showing a method for manufacturing a porous sheet in accordance with a first embodiment of the present invention.

FIG. 5 is a flowchart showing a method for manufacturing a porous sheet in accordance with a first embodiment of the present invention.

Referring to FIG. 5, as the first step, a spinning solution is prepared by mixing a polymer solution in which a polymer is dissolved and an adhesive solution in which an adhesive material is dissolved (S110).

Here, the polymer is a main material of fine-fibers which are formed in the following process. In this embodiment, the polymer may be one or a mixture of two or more selected from the group consisting of polyvinylidene fluoride, polyvinyl alcohol, polyethylene terephthalate, polycarbonate, polyetherimide, polyethylene oxide, polylactic acid, cellulose, aromatic polyester, polyphosphazenes, polyurethane, polyurethane copolymer including polyether urethane, cellulose acetate, cellulose acetate butylate, cellulose acetate propionate, polyvinylidene fluoride, perfluoropolymer, polyvinylchloride, polyvinylidene chloride, polyethylene glycol derivatives, polyoxide, polyvinyl acetate, polystyrene, polyacrylonitrile, and polymethylmethacrylate but not particularly limited thereto, and polymers commonly used such as water-soluble polymers or organic polymers can be used.

In this embodiment, the adhesive material is an acrylate material which is a natural curable material but not particularly limited thereto, and it is also possible to use a thermosetting material, a UV curable material, or the same material as the polymer material which is used as a main material of the above-described fine-fiber.

The polymer solution is prepared by dissolving the polymer material in a solvent. Generally, the solvents are classified into inorganic solvents and organic solvents. The typical inorganic solvents may include water, and the typical organic solvents may include ether, acetone, or alcohol. In this embodiment, any kind of solvents can be used.

As described above, the adhesive solution is also prepared by dissolving the adhesive material in a solvent. In this embodiment, the adhesive material content in the adhesive solution may be 30 to 50 wt % but not particularly limited thereto. The adhesive material content in the adhesive solution may be less than or greater than the above weight range.

The spinning solution is a solution for electrospinning. In this embodiment, the spinning solution, in which the polymer solution content is 85 to 97.5 wt % and the adhesive solution content is 2.5 to 15 wt %, is used but not particularly limited thereto, and it is possible to use the spinning solution in which the polymer solution of less content and the adhesive solution of greater content are mixed.

For example, apparently, it is possible to use the spinning solution in which the polymer solution and the adhesive solution are mixed at a mixing ratio with appropriate porosity and strength according to applied products.

Next, as the second step, fine-fibers, in which the polymer and the adhesive material are mixed, are formed by electrospinning the spinning solution prepared as above on a support layer (S120).

At this time, in order to improve bonding strength between the fine-fibers and the support layer, the electrospinning process may be performed in a state in which an adhesive is previously applied on the support layer.

Here, the electrospinning method is a method of obtaining a product by instantaneously spinning a polymer in a low viscosity state into fibers by electrostatic force.

The electrospinning method uses a high voltage to obtain a charged polymer jet solution or a melt. This charged polymer jet solution or melt is dried or solidified to obtain polymer fibers. The solution or melt is spin-coated to attach one electrode to a surface of the other current collector. A subject of electrical area is to allow the polymer solution to adhere to an end portion of a capillary tube by its tension.

As spinning methods, there are melt spinning and solution spinning. In the solution spinning, wet spinning which does not use a solvent when spinning a polymer solution into filaments and dry spinning which uses a solvent and removes the solvent by hot air or inert gas are generally commercialized.

In this embodiment, by electrospinning the spinning solution in which the polymer solution and the adhesive solution are mixed, it is possible to form the fine-fibers having a form in which the polymer material and the adhesive material are mixed.

Like this, by having the form in which the polymer material and the adhesive material are mixed, cross portions of the fine-fibers can be bonded to each other by the adhesive material mixed in the fine-fiber with the polymer material.

Figure 6:
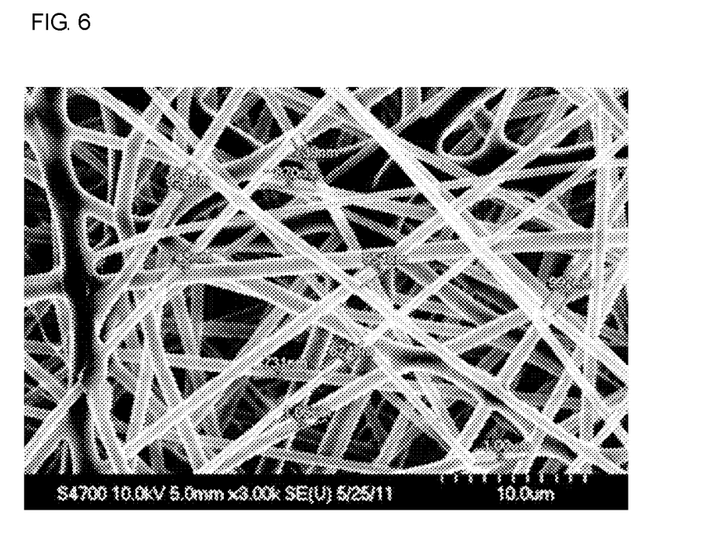
FIG. 6 is a view illustrating a diameter of a fine-fiber in which an adhesive material is mixed when an adhesive solution content in a spinning solution is 7.5 wt % in the method for manufacturing a porous sheet in accordance with the first embodiment of the present invention.
Figure 7:
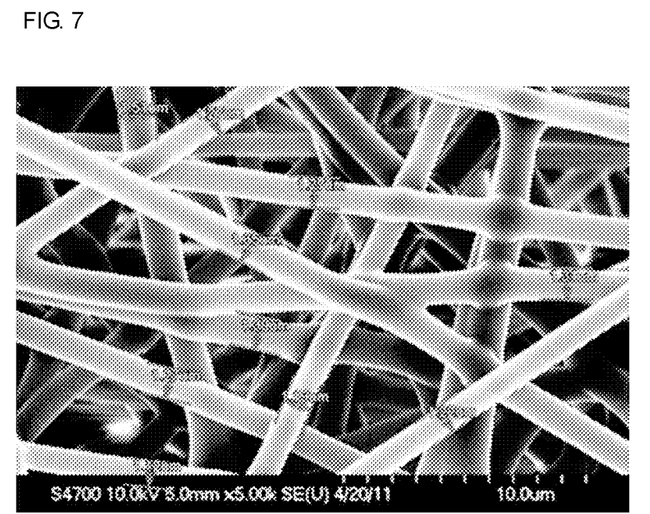
FIG. 7 is a view illustrating the diameter of the fine-fiber in which the adhesive material is mixed when the adhesive solution content in the spinning solution is 10 wt % in the method for manufacturing a porous sheet in accordance with the first embodiment of the present invention.
Figure 8:
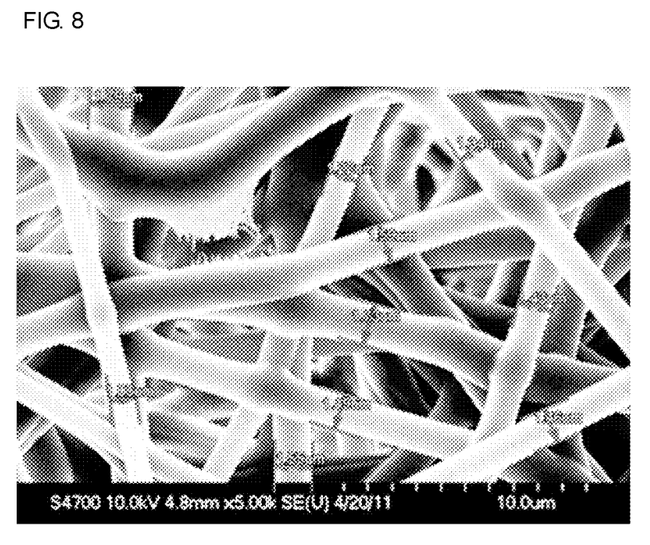
FIG. 8 is a view illustrating the diameter of the fine-fiber in which the adhesive material is mixed when the adhesive solution content in the spinning solution is 15 wt % in the method for manufacturing a porous sheet in accordance with the first embodiment of the present invention.

Further, in accordance with this embodiment, as the adhesive material content in the spinning solution is increased, a diameter of the fine-fiber in which the adhesive material is mixed can be increased, and experimental results of this are shown in FIGS. 6 to 8.

As a result of experiments, as shown in FIG. 6, an average diameter of the fine-fibers, in which the adhesive material is mixed, formed by electrospinning the spinning solution in which the mixed adhesive solution content is 7.5 wt % is 866.2 nm. As shown in FIG. 7, the average diameter of the fine-fibers, in which the adhesive material is mixed, formed by electrospinning the spinning solution in which the adhesive solution content is 10 wt % is 1.284 nm. As shown in FIG. 8, the average diameter of the fine-fibers, in which the adhesive material is mixed, formed by electrospinning the spinning solution in which the adhesive solution content is 15 wt % is 1.468 nm.

Like this, as the adhesive solution content in the spinning solution is increased, the diameter of the formed fine-fiber, in which the adhesive material is mixed, is increased. As the diameter of the fine-fiber is increased, it is possible to obtain an effect of improving porosity than the state in which the fine-fibers with a small diameter are closely entangled.

Next, a fine-fiber web layer is formed by curing the entangled fine-fibers, in which the adhesive material is mixed, to bond the fine-fibers by the adhesive material (S130). At this time, a separate step for curing is not needed, and the fine-fibers can be naturally cured after electrospinning. Further, treatments such as hot air drying may be performed according to needs.

Further, the curing method may be different according to whether the adhesive material is a natural curable material, a thermosetting material, or a UV curable material. Generally, the curing method may include natural curing, thermal curing, or UV curing but not particularly limited thereto. In this embodiment, natural curing is performed by using a natural curable acrylate material as the adhesive material.

That is, the fine-fibers formed by mixing the polymer and the adhesive material are cured in a state in which they are entangled with each other so that the fine-fibers in the crossing portions are bonded to each other by the adhesive material.

Like this, strength of the fine-fiber web consisting of the fine-fibers whose cross portions are bonded to each other is remarkably increased than a fine-fiber web electrospun without an adhesive material of the prior art.

Figure 9:
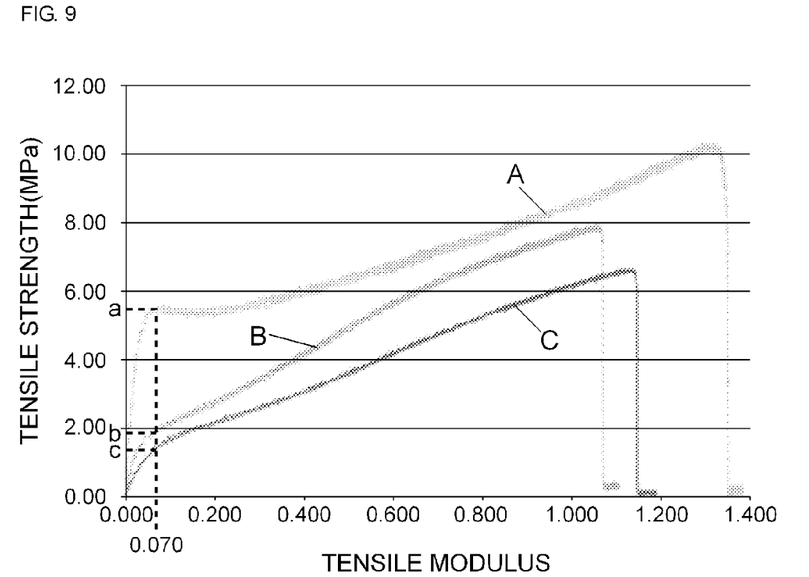
FIG. 9 is a graph showing tensile strength to tensile modulus of a fine-fiber web layer when the adhesive solution contents in the spinning solution are 0 wt %, 5 wt %, and 15 wt %, respectively, in the method for manufacturing a porous sheet in accordance with the first embodiment of the present invention.

At this time, as the adhesive solution content in the spinning solution is increased, tensile strength of the fine-fiber web is also increased, and experimental data for this is shown as a graph in FIG. 9.

In the graph shown in FIG. 9, an X-axis represents a degree of stretching (tensile modulus), and a Y-axis represents a degree of withstanding stretching (tensile strength).

Further, A represents tensile strength to tensile modulus when the adhesive solution content in the spinning solution is 15 wt %, B represents tensile strength to tensile modulus when the adhesive solution content in the spinning solution is 5 wt %, and C represents tensile strength to tensile modulus when the adhesive solution content in the spinning solution is 0 wt %.

When looking into FIG. 9, the tensile strengths A, B, and C are about 5.30 MPa, 1.90 MPa, and 1.20 MPa, respectively, when the tensile modulus is 0.070. It is possible to check that the tensile strength to the same tensile modulus is remarkably increased as the adhesive solution content in the spinning solution is increased.

Like this, the tensile strength of the fine-fiber web formed according to this embodiment can be remarkably improved than the conventional fine-fiber web without including an adhesive material.

Second Embodiment

Figure 10:
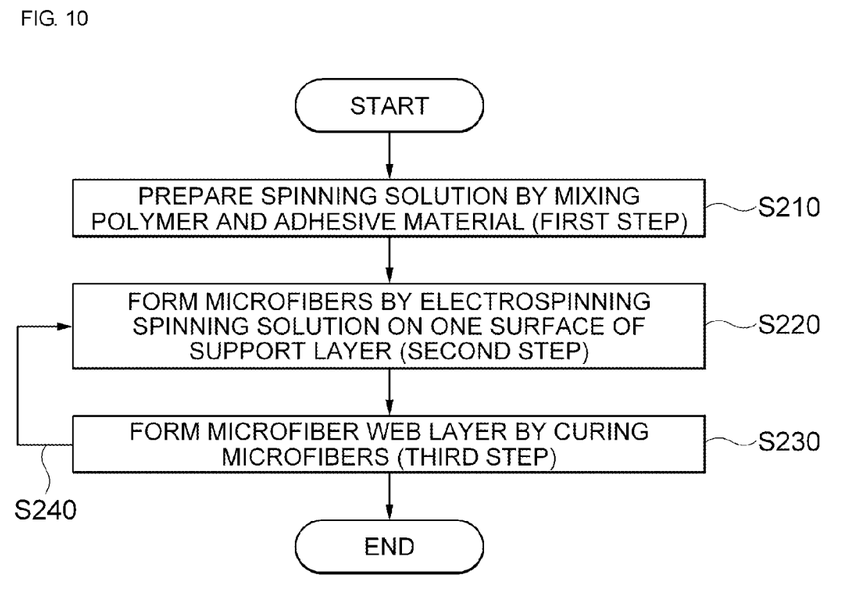
FIG. 10 is a flowchart showing a method for manufacturing a porous sheet in accordance with a second embodiment of the present invention.

FIG. 10 is a flowchart showing a method for manufacturing a porous sheet in accordance with a second embodiment of the present invention. Here, description overlapping with those of the above-described embodiments will be omitted.

In this embodiment, in the second step, after electrospinning a spinning solution on only one surface of a support layer (S220), fine-fibers are cured (S230).

Next, after feeding back to the second step (S240), the second step and the third step are performed on the other surface of the support layer, on which the fine-fibers are not electrospun.

The method for manufacturing a porous sheet in accordance with this embodiment can be applied to the case in which fine-fiber web layers are formed on both surfaces of the support layer. It is possible to reduce damage to the fine-fiber web layer or deterioration of adhesion between the fine-fiber web layer and the support layer in a process of manufacturing a porous sheet by sequentially forming the fine-fiber web layers on the both surfaces of the support layer.

Third Embodiment

Figure 11:
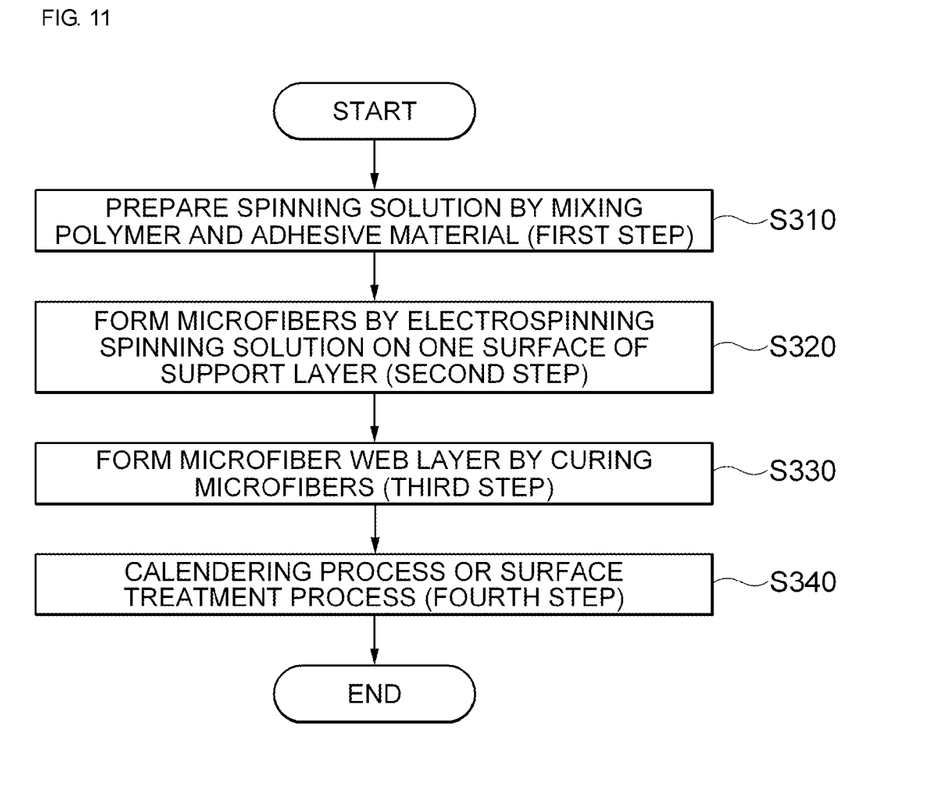
FIG. 11 is a flowchart showing a method for manufacturing a porous sheet in accordance with a third embodiment of the present invention.

FIG. 11 is a flowchart showing a method for manufacturing a porous sheet in accordance with a third embodiment of the present invention. Here, description overlapping with those of the above-described embodiments will be omitted.

In this embodiment, after performing the third step of the first embodiment or the second embodiment, an additional process (S340) of improving characteristics of the fine-fiber web layer is further included.

That is, a process of compressing the fine-fiber web formed after forming the fine-fiber web layer may be added. The compression process may be performed by calendering but not particularly limited thereto.

Like this, it is possible to obtain a fine-fiber web with a uniform thickness by compressing the fine-fiber web through calendering.

Further, a surface treatment process of coating an antistatic agent, an antifouling agent, or a strength reinforcing agent on the fine-fiber web layer may be further included.

Fourth Embodiment

Figure 12:
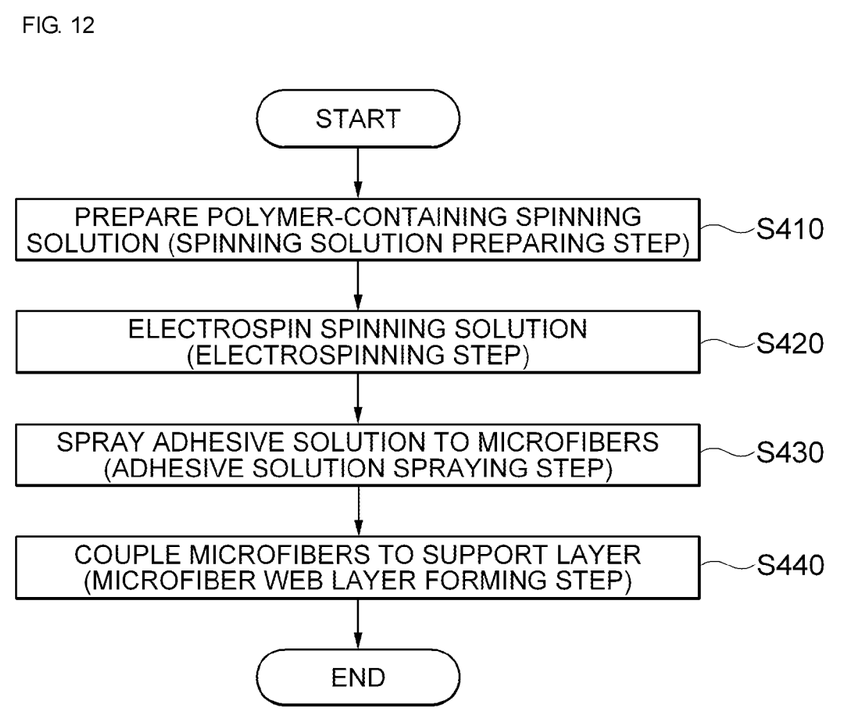
FIG. 12 is a flowchart showing a method for manufacturing a porous sheet in accordance with a fourth embodiment of the present invention.

FIG. 12 is a flowchart showing a method for manufacturing a porous sheet in accordance with a fourth embodiment of the present invention. Here, description overlapping with those of the above-described embodiments will be omitted.

First, a polymer-containing spinning solution is prepared (S410).

In this embodiment, as described in the first embodiment, the polymer may be one or a mixture of two or more selected from the group consisting of polyvinylidene fluoride, polyvinyl alcohol, polyethylene terephthalate, polycarbonate, polyetherimide, polyethylene oxide, polylactic acid, cellulose, aromatic polyester, polyphosphazenes, polyurethane, polyurethane copolymer including polyether urethane, cellulose acetate, cellulose acetate butylate, cellulose acetate propionate, polyvinylidene fluoride, perfluoropolymer, polyvinylchloride, polyvinylidene chloride, polyethylene glycol derivatives, polyoxide, polyvinyl acetate, polystyrene, polyacrylonitrile, and polymethylmethacrylate but not particularly limited thereto, and polymers commonly used such as water-soluble polymers or organic polymers can be used.

Next, fine-fibers are formed by electrospinning the spinning solution (S420).

Next, the fine-fibers to which an adhesive material is attached are formed by spraying an adhesive solution, in which the adhesive material is dissolved, toward the formed fine-fibers (S430). At this time, spraying may be performed by a spraying method but not particularly limited thereto.

Here, in this embodiment, the adhesive material is an acrylate material which is a natural curable material but not particularly limited thereto, and it is also possible to use a thermosetting material, a UV curable material, and the same material as the polymer which is used as a main material of the above-described fine-fiber 111.

Further, the adhesive solution is prepared by dissolving the adhesive material in a solvent, and in this embodiment, the adhesive solution in which the adhesive material content is 30 to 50 wt % is used but not particularly limited thereto.

Next, a fine-fiber web layer is formed by coupling the fine-fibers, to which the adhesive material is attached, to the support layer (S440).

That is, after the adhesive solution in which the adhesive material is dissolved is sprayed to the fine-fibers bundled by a bundling device and entangled through electrospinning to form the fine-fibers to which the adhesive material is attached, the fine-fibers to which the adhesive material is attached are cured so that cross portions of the fine-fibers are bonded by the adhesive material left after the solvent in the sprayed adhesive solution is volatilized.

Like this, by forming the fine-fiber web in which the cross portions of the fine-fibers are bonded by the adhesive material, the fine-fiber web in accordance with this embodiment can have remarkably high strength than before when compared to a conventional fine-fiber web obtained by electrospinning only a polymer solution.

At this time, the adhesive material may be attached to a surface of the fine-fiber. That is, while the fine-fiber in the first embodiment is formed by mixing the polymer material and the adhesive material, the fine-fiber in this embodiment is formed by attaching the adhesive material to a surface of the polymer material.

Further, the curing may be performed as natural curing, thermal curing, or UV curing according to characteristics of the adhesive material, for example, whether the adhesive material is a natural curable material, a thermosetting material, or a UV curable material but not particularly limited thereto.

At this time, the fine-fiber web layer and a support layer may be coupled by applying an adhesive on the fine-fiber web layer or the support layer after curing the fine-fibers.

Further, the adhesive may be one or at least two kinds of materials selected from epoxy adhesives, acrylate adhesives, and silicone adhesives and sprayed to all or a portion of a surface of an object to be adhered by a spraying method.

Accordingly, it is possible to prevent reduction of air permeability due to the adhesive.

Meanwhile, the fine-fiber web layer may be formed by using a polymer solution in which a polymer is dissolved to bond the fine-fiber web layer and the support layer or heating and pressing all or a portion of the fine-fibers after bringing the fine-fibers in contact with the support layer.

Further, the fine-fiber web layer may be formed by curing the fine-fibers after coupling the fine-fibers to the support layer.

In this embodiment, an additional process (S340) such as a calendering process or a surface treatment process for improving the characteristics of the fine-fiber web layer may be further performed.

The porous sheet manufactured in accordance with the above-described embodiments can be applied to various fields including a suction sheet and a separator.

Since the porous sheet in accordance with an embodiment of the present invention consists of the fine-fiber web layer, it has high porosity due to characteristics of the fine-fiber and thus its suction and peeling properties can be improved.

Further, the porous sheet in accordance with an embodiment of the present invention can be implemented with sufficient strength and thickness to be used in peeling and laminating processes of a multilayer ceramic capacitor by coupling the fine-fiber web layer to one or both surfaces of the support layer.

Further, since the porous sheet in accordance with an embodiment of the present invention consists of the fine-fiber web layer and thus is excellent in softness and surface roughness, it can minimize damage to an object to be sucked while facilitating vacuum suction fixation.

Further, since the porous sheet in accordance with an embodiment of the present invention is manufactured using electrospinning, it is possible to facilitate manufacturing processes and select various raw materials for preparing a material suitable for characteristics of a product to be sucked.

Further, according to an embodiment of the present invention, the fine-fibers, which cross each other, are bonded by the adhesive material and thus the strength of the fine-fiber web layer is high. Therefore, since an additional process for improving the strength of the fine-fiber web layer can be omitted, it is possible to reduce manufacturing costs by simplifying the manufacturing processes.

The foregoing description illustrates the present invention. Additionally, the foregoing description shows and explains only the preferred embodiments of the present invention, but it is to be understood that the present invention is capable of use in various other combinations, modifications, and environments and is capable of changes and modifications within the scope of the inventive concept as expressed herein, commensurate with the above teachings and/or the skill or knowledge of the related art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for manufacturing a porous sheet comprising:
a spinning solution preparing step of preparing a spinning solution by mixing a polymer solution in which a polymer is dissolved and an adhesive solution in which an adhesive material is dissolved;
an electrospinning step of forming fine-fibers in which the polymer and the adhesive material are mixed by electrospinning the spinning solution;
an adhesive solution spraying step of spraying the adhesive solution in which the adhesive material is dissolved toward the fine-fibers; and
a fine-fiber web layer forming step of forming a fine-fiber web layer by coupling the fine-fibers passed through the adhesive solution spraying step to a support layer.

2. A method for manufacturing a porous sheet comprising:
a spinning solution preparing step of preparing a spinning solution by mixing a polymer solution in which a polymer is dissolved and an adhesive solution in which an adhesive material is dissolved;
an electrospinning step of forming fine-fibers in which the polymer and the adhesive material are mixed by electrospinning the spinning solution;
a polymer solution spraying step of spraying the polymer solution in which the polymer is dissolved toward all or a portion of the fine-fibers; and
a fine-fiber web layer forming step of forming a fine-fiber web layer by coupling the fine-fibers passed through the polymer solution spraying step to a support layer.

* * * * *